US010923442B2

(12) United States Patent
Savidis et al.

(10) Patent No.: US 10,923,442 B2
(45) Date of Patent: Feb. 16, 2021

(54) PROTECTING ANALOG CIRCUITS WITH PARAMETER BIASING OBFUSCATION

(71) Applicant: Drexel University, Philadelphia, PA (US)

(72) Inventors: Ioannis Savidis, Wallingford, PA (US); Vaibhav Venugopal Rao, Philadelphia, PA (US); Kyle Juretus, Quakertown, PA (US)

(73) Assignee: Drexel University, Philadelphia, PA (US)

( * ) Notice: Subject to any disclaimer, the term of this patent is extended or adjusted under 35 U.S.C. 154(b) by 272 days.

(21) Appl. No.: 15/918,278

(22) Filed: Mar. 12, 2018

(65) Prior Publication Data
US 2018/0301426 A1 Oct. 18, 2018

Related U.S. Application Data

(60) Provisional application No. 62/469,725, filed on Mar. 10, 2017.

(51) Int. Cl.
H01L 23/00 (2006.01)
G09C 1/00 (2006.01)
(Continued)

(52) U.S. Cl.
CPC .............. H01L 23/576 (2013.01); G09C 1/00 (2013.01); H03B 5/1212 (2013.01);
(Continued)

(58) Field of Classification Search
CPC ....... H01L 23/576; G09C 1/00; H03B 5/1212; H03B 5/1228; H03B 5/1246; H03B 7/06;
(Continued)

(56) References Cited

U.S. PATENT DOCUMENTS 5,227,930 A * 7/1993 Thanos .............. G11B 5/59677
360/77.03
5,623,549 A * 4/1997 Ritter .................... H04L 9/0625
380/37
(Continued)

OTHER PUBLICATIONS

Wikipedia, (Comparator, https://en.wikipedia.org/wiki/Comparator, Jul. 1, 2004, hereinafter Wikipedia).*
(Continued)

Primary Examiner — Farid Homayounmehr
Assistant Examiner — Raied A Salman
(74) Attorney, Agent, or Firm — Schott, P.C.

(57) ABSTRACT

A key based technique that targets obfuscation of critical circuit parameters of an analog circuit block by masking physical characteristics of a transistor (width and length) and the circuit parameters reliant upon these physical characteristics (i.e. circuit biasing conditions, phase noise profile, bandwidth, gain, noise figure, operating frequency, etc.). The proposed key based obfuscation technique targets the physical dimensions of the transistors used to set the optimal biasing conditions. The widths and/or lengths of a transistor are obfuscated and, based on an applied key sequence, provides a range of potential biasing points. Only when the correct key sequence is applied and certain transistor(s) are active, are the correct biasing conditions at the target node set.

19 Claims, 8 Drawing Sheets

(51) Int. Cl.
| | |
|---|---|
| H03L 7/089 | (2006.01) |
| H03B 5/12 | (2006.01) |
| H03L 7/091 | (2006.01) |
| H04L 9/32 | (2006.01) |
| H04L 9/08 | (2006.01) |
| H03L 7/085 | (2006.01) |
| H03B 7/06 | (2006.01) |

(52) U.S. Cl.
CPC ......... *H03B 5/1228* (2013.01); *H03B 5/1246* (2013.01); *H03L 7/0891* (2013.01); *H03L 7/091* (2013.01); *H04L 9/0866* (2013.01); *H04L 9/3278* (2013.01); *H03B 7/06* (2013.01); *H03B 2200/0038* (2013.01); *H03B 2201/0208* (2013.01); *H03L 7/085* (2013.01); *H04L 2209/08* (2013.01); *H04L 2209/16* (2013.01)

(58) Field of Classification Search
CPC .... H03B 2200/0038; H03B 2201/0208; H03L 7/0891; H03L 7/091; H03L 7/085; H04L 9/0866; H04L 9/3278; H04L 2209/08; H04L 2209/16
See application file for complete search history.

(56) References Cited

U.S. PATENT DOCUMENTS

| | | | | |
|---|---|---|---|---|
| 6,925,135 | B2* | 8/2005 | Smith | H03L 7/07 375/354 |
| 7,564,284 | B2* | 7/2009 | Henzler | G04F 10/06 327/233 |
| 8,289,516 | B2* | 10/2012 | Hofmans | G03F 7/70683 356/401 |
| 8,466,627 | B2* | 6/2013 | Radermacher | H05B 45/37 315/194 |
| 9,503,105 | B2* | 11/2016 | Mirajkar | H03L 7/095 |
| 9,898,566 | B2* | 2/2018 | Iskander | G06F 30/36 |
| 2006/0236107 | A1* | 10/2006 | Ishibashi | H04L 9/0822 713/169 |
| 2007/0025490 | A1* | 2/2007 | Azadet | H03L 7/093 375/376 |
| 2016/0112018 | A1* | 4/2016 | Scuderi | H03F 3/211 330/295 |
| 2016/0182045 | A1* | 6/2016 | Mai | G09C 1/00 326/8 |
| 2018/0301426 | A1* | 10/2018 | Savidis | H01L 23/576 |
| 2020/0076439 | A1* | 3/2020 | Weeks | H03L 7/0805 |

OTHER PUBLICATIONS

Harvard, (Computer Science 246 Advanced Computern Architecture, http://www.eecs.harvard.edu/~dbrooks/cs246/cs246-lecture2.pdf, May 23, 2006, hereinafter Harvard).*

MIT, (Op Amps for Everyone, https://web.mit.edu/6.101/www/reference/op_amps_everyone.pdf, Mar. 28, 2016, hereinafter MIT).*

Kyle Juretus, et al., Securing Analog Mixed-Signal Integrated Circuits Through Shared Dependencies, GLSVLSI '19: Proceedings of the 2019 on Great Lakes Symposium on VLSIMay 2019 pp. 483-488.*

"The U.S. Semiconductor Industry: 2014 Factbook," SIA, Semiconductor Industry Association, pp. 1-28 (Mar. 2014).

Deng, Y., "SAT-Based Verification for Analog and Mixed-Signal Circuits," Submitted to the Office of Graduate Studies ofcTexas A&M University, A Thesis, pp. 65 (May 2012).

Guin, U., et al., "Counterfeit Integrated Circuits: A Rising Threat in the Global Semiconductor Supply Chain," Proceedings of the IEEE, vol. 102, No. 8, pp. 1207-1228 (2014).

Hijimiri, A., "Noise in Phase-Locked Loops," Proceedings of the IEEE Southwest Symposium on Mixed-Signal Design, pp. 1-6 (2001).

Hsieh, M. T., and Sobelman, G. E., "Comparison of LC and Ring VCOs for PLLs in a 90 nm Digital CMOS Process," Proceedings of International SoC Design Conference ((ISOCC), pp. 19-22 (2006).

ITRS, "International Technology Roadmap for Semiconductors," 2011 Edition, Executive Summary, The International Technology Roadmap for Semiconductors, pp. 110 (Mar. 2011).

Juretus, K., and Savidis, I., "Reduced Overhead Gate Level Logic Encryption," Proceedings of the IEEE/ACM Great Lakes Symposium on Very Large Scale Integration (GLSVLSI), pp. 15-20 (2016).

Juretus, K., and Savidis, I., "Reducing Logic Encryption Overhead Through Gate Level Key Insertion," Proceedings of the IEEE International Symposium on Circuits and Systems (ISCAS), pp. 1714-1717 (2016).

Lahiouel, O., et al., "Towards Enhancing Analog Circuits Sizing Using SMT-based Techniques," 52nd ACM/EDAC/IEEE Design Automation Conference (DAC), pp. 1-6 (2015).

Mukherjee, R., et al., "Formal Techniques for Effective Co-verification of Hardware/Software Co-designs," DAC '17 Proceedings of the 54th Annual Design Automation Conference 2017, Article No. 35, pp. 1-6 (2017).

Narayan, N., et al., "IP Protection for VLSI Designs via Watermarking of Routes," Proceedings 14th Annual IEEE International ASIC/SOC Conference (IEEE Cat. No. 01TH8558), pp. 406-410 (2001).

Newbould, R.D., et al., "Mixed Signal Design Watermarking for IP Protection," Proceedings of the Southwest Symposium on Mixed-Signal Design, pp. 110-115 (2001).

Prasad, M.R., et al., "A Survey of Recent Advances in SAT-Based Formal Verification," International Journal on Software Tools for Technology Transfer manuscript No. vol. 7, Issue 2, pp. 156-173 (2005).

Rajendran, J., et al., "Security Analysis of Integrated Circuit Camouflaging," CCS '13 Proceedings of the 2013 ACM SIGSAC conference on Computer & communications security, pp. 709-720 (2013).

Rao, V.V. and Savidis, I., "Protecting Analog Circuits with Parameter Biasing Obfuscation," 18th IEEE Latin American Test Symposium (LATS), pp. 1-6 (2017).

Rao, V.V., and Savidis, I., "Analog Circuit Transistor Sizing for Parameter Obfuscation Using Satisfiability Modulo Theory," Department of Electrical and Computer Engineering, Drexel University, pp. 1-5 (2018).

Rao, V.V., and Savidis, I., "Security Oriented Analog Circuit Design Using Satisfiability Modulo Theory Based Search Space Exploration," ECE Department, Drexel University, pp. 1-5 (2018).

Razavi, B., "Design of Analog CMOS Integrated Circuits," McGraw-Hill, first edition, Chapter 14, pp. 1-98 (2001).

Razavi, B., "Design of Integrated Circuits for Optical Communications," McGraw-Hill, A Division of the McGraw-Hill Companies, pp. 1-124 (2003).

Scheible, J., and Lienig, J., "Automation of Analog IC Layout: Challenges and Solutions," ISPD '15 Proceedings of the 2015 Symposium on International Symposium on Physical Design, pp. 33-40 (2015).

Scheibler, K., et al., "Recent Improvements in the SMT Solver iSAT," Albert Ludwigs Universität, Freiburg, pp. 1-11 (2013).

Thomas, L., "The Design of CMOS Radio-Frequency Integrated Circuits," Cambridge university press, p. 1 (2003).

Torrance, R., and James, D., "The State-of-the-Art in IC Reverse Engineering," Proceedings of the Conference on Cryptographic Hardware and Embedded Systems (CHES), pp. 363-381 (2009).

Torrance, R., and James, D., "The State-of-the-Art in Semiconductor Reverse Engineering," Proceedings of the IEEE Design Automation Conference, pp. 333-338 (2011).

Wang, J., et al., "Thwarting Analog IC Piracy via Combinational Locking," IEEE International test Conference, pp. 1-10 (2017).

White, M., and Chen, Y., "Scaled CMOS Technology Reliability Users Guide," Report on Electronic Parts and Packaging (NEPP) Program Office of Safety and Mission Assurance, Jet Propulsion Laboratory, National Aeronautics and Space Administration, pp. 1-22 (2008).

* cited by examiner

FIG. 1A
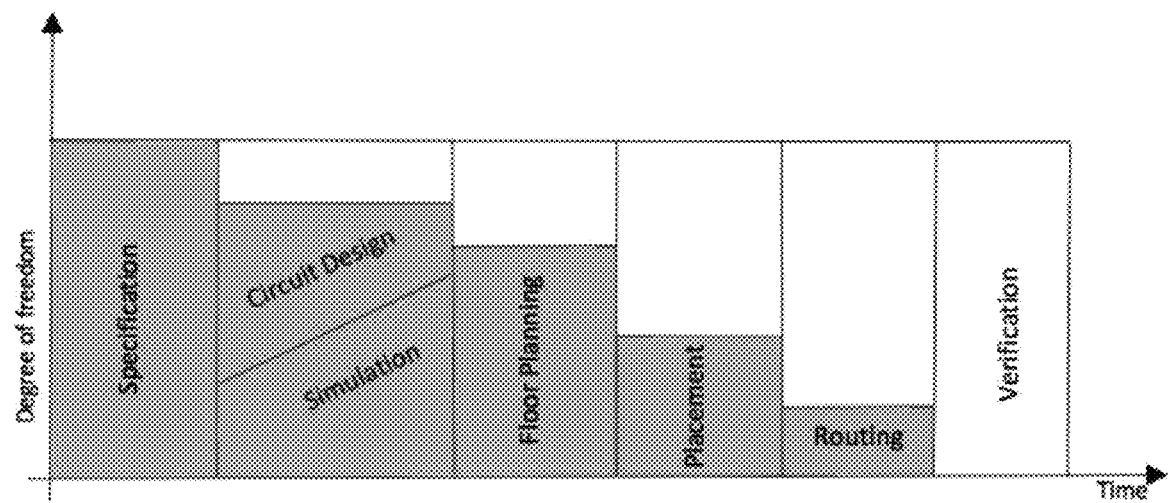
(a)
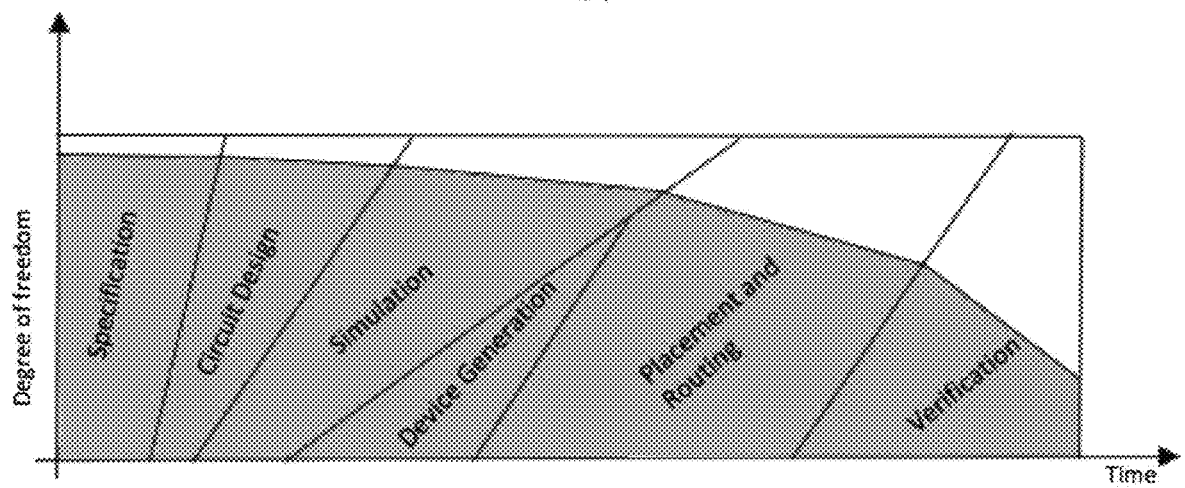
(b)
FIG. 1B

PROTECTING ANALOG CIRCUITS WITH PARAMETER BIASING OBFUSCATION

STATEMENT REGARDING GOVERNMENT SUPPORT

This invention was made with government support under Contract No. CNS1648878 awarded by the National Science Foundation. The government has certain rights in the invention.

BACKGROUND

Integrated circuits (ICs) are broadly used in products ranging from household devices to defense systems. ICs often include digital, analog, and radio frequency components on a single die. Over the last few decades, a rapid growth in the IC market has lead to the globalization of the IC supply chain. As a result of globalization, IC manufacturing has shifted from trusted in-house to unknown or lesser known offshore foundries. While offshore production has resulted in the reduction of the cost of an IC, concerns in reliability, and security have increased. An untrusted third-party foundry is capable of intellectual property (IP) theft, IC counterfeiting, IC overproduction, and the insertion of malicious circuitry (hardware Trojans), all of which pose an important new security threat to systems that rely upon these untrusted ICs.

With the global semiconductor industry estimated to have generated revenues of $345 billion dollars in 2013, approximately $54 billion was contributed by the analog IC market. Although a large number of modern electronic components are digital, most function in a world of continuously varying analog inputs. The analog circuits are small as compared to the digital components, however, due to increased complexity, a large amount of time and resources are allocated for analog IC design. Electronic products from appliances and cell phones in consumer electronics to radars and communication devices used in military applications often include analog circuits that are integrated with digital computing cores.

Techniques to protect analog intellectual property are mostly overlooked as analog ICs typically have a small footprint and are challenging to design. Analog IC design significantly differs from digital design, and includes:
greater precision in biasing conditions,
greater sensitivity to noise and temperature,
greater emphasis on signal integrity,
tighter noise margins, and
simultaneous consideration of multiple parameters of the design process (whereas digital circuits follow a sequential design flow), as shown in FIGS. 1A and 1B.

The additional design considerations for analog ICs results in increased challenges when implementing security features. In addition, the complexity of the design motivates an adversary to steal or counterfeit analog IP to save time and resources. There are a limited number of techniques for analog IP protection, with watermarking and camouflaging predominantly used. Although both techniques protect analog IP, the end user or foundry are not prevented from reverse engineering and counterfeiting the IP, as the foundry has access to all information pertaining to the production of the IC.

SUMMARY OF THE EMBODIMENTS

The device, system, and method herein describes an obfuscation technique to protect analog IP from counterfeiting and IC overproduction. A technique that obfuscates the critical biasing conditions of an analog circuit masks the desired functional parameters of the circuit block. In the technique, a phase locked loop local oscillator masks the target mixer frequency of a superheterodyne receiver.

BRIEF DESCRIPTION OF THE DRAWINGS

FIGS. 1A and 1B show a comparison of design flows: a) Stepwise reduction of degrees of freedom for digital circuits, and b) continuous reduction of degrees of freedom and overlap of design flow for analog circuits.

DETAILED DESCRIPTION OF THE EMBODIMENTS

I. Threat Model

For the sake of discussion of the technique and device herein, assume that there is an untrusted foundry with access to the IC design and possession of the necessary tools and skills to counterfeit and overproduce the IC from a provided Graphic Database System (GDS-II) file. In addition, assume that the circuit in the design stage is trusted and devoid of any malicious components.

An additional threat model may include an untrusted end user who may take advantage of the fact that advances in imaging tools and delayering processes provide the means to reverse engineer and steal IP with feature sizes smaller than 50 nanometers.

II. Characteristics of Analog Phase Locked Loops

Accurate characterization of device parasitics and process, voltage, and temperature (PVT) variations are necessary to guarantee the correct performance of an analog IC. Parameter characterization is critical in setting the proper biasing conditions of the analog circuits, which directly affects the circuit performance. In this section, an overview of the phase locked loop (PLL) and a description of critical PLL parameters are provided.

A. Phase Locked Loops (PLL)

Figure 2:
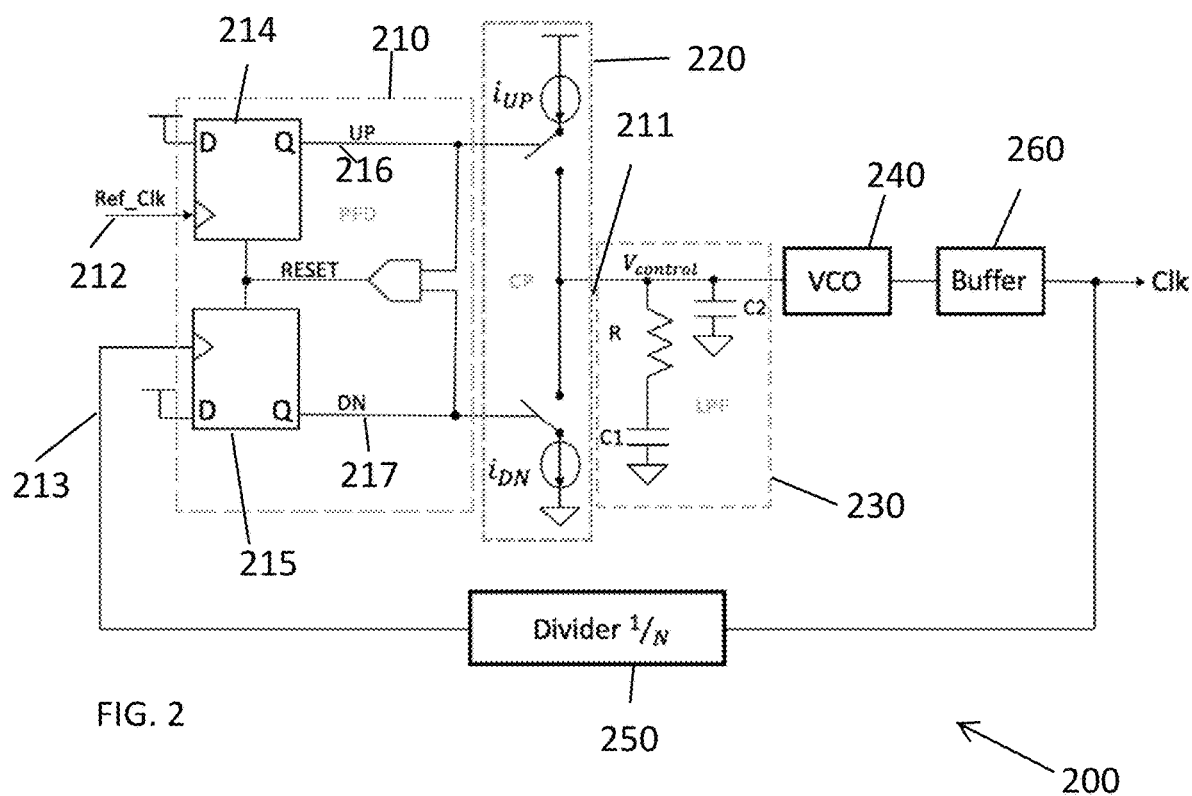
FIG. 2 is a block diagram of a Type-II 3rd order PLL.

Phase locked loops (PLLs) may be found in an integrated circuit. The primary task of the PLL is to provide a cyclic output signal that maintains phase coherence with a reference input signal. A low frequency reference clock is used as an input, which is typically provided by an off-chip crystal oscillator, and is multiplied by a ratio N to generate a high frequency clock. The PLL is used as a high frequency clock, a frequency multiplier, or for clock de-skew. A PLL 200 may include a phase-frequency detector (PFD) 210, charge-pump (CP) 220, loop filter (LF) 230, voltage controlled oscillator (VCO) 240, in parallel with a frequency divider 260, as shown in FIG. 2.

(1) Phase-Frequency Detector: The phase-frequency detector (PFD) 210 generates a voltage signal 216, 217 corresponding to the phase difference between the reference clock 212 and feedback path 213, which are fed into flip flops 214, 215. When the two signals 212, 213 of the PFD have a zero-phase difference, the PFD generates a constant output voltage. When there is a phase difference between the two signals 212, 213, a varying voltage is generated dependent on which of the two signals is leading or lagging. The PFD 210 may be implemented using a positive edge triggered D flip-flop (DFF) topology, where: 1) there may be no dependency on the duty cycle of the input, 2) the PFD may exhibit a 180-degree static phase shift, and 3) a constant gain over a range of $2\pi$ phase difference may be provided. The D flip-flop based PFD 210 produces two outputs, UP 216 and DOWN 217, depending on the phase difference between the reference and feedback signals.

Charge pump 220 converts the logical output signals 216 and 217 of the PFD 210 to an analog signal ($V_{control}$) 211 suitable to control the voltage-controlled oscillator (VCO) 240. Charge pump 220 includes current sources and switches. The output of the charge pump is connected to a low pass filter (LPF) 230 that integrates the charge pump output current to an equivalent VCO control voltage ($V_{control}$) 211.

A second order low pass filter or loop filter (LF) 230 is used to convert the current from the charge pump to a voltage ($V_{control}$) 211. The inclusion of the loop filter 230 serves two functions, (i) to filter current spikes, and (ii) add stability to the system 200. The output voltage ($V_{control}$) 211 of the loop filter 230 controls the oscillation frequency of the VCO. The loop filter voltage will increase if the feedback signal 213 leads the reference clock 212 and will decrease if the reference clock 212 leads the feedback signal 213. If the PLL is in a locked state it maintains a constant value.

(2) Voltage Controlled Oscillator: Generally, a VCO is an oscillator with a oscillation frequency that is controlled by a voltage input. An applied input voltage determines the instantaneous oscillation frequency. Consequently, a VCO can be used for frequency modulation (FM) or phase modulation (PM) by applying a modulating signal to the control input.

The voltage controlled oscillator (VCO) 240 may generate an oscillation frequency controlled by an input voltage from the charge pump 220. The performance of the PLL 220 may be affected by the design of the VCO 220.

The signal from the VCO 240 passes through a buffer 260 that converts the sinusoidal signal to the square/pulse clock. Also, the clock signal is fed back to the PFD 210 through the frequency divider 250 to maintain a constant phase with respect to the input reference signal 212.

Figure 3:
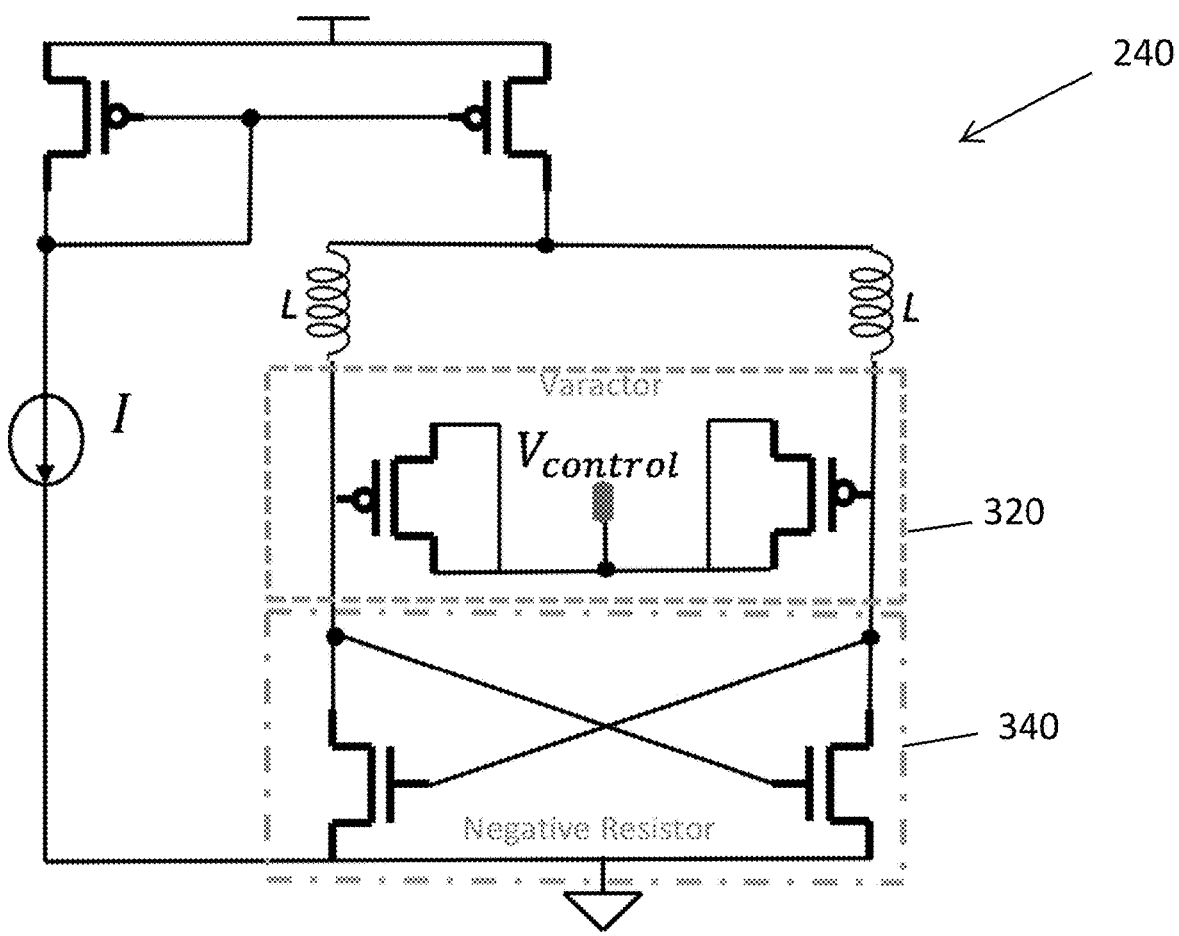
FIG. 3 is a circuit diagram of a LC VCO.

FIG. 3 shows a schematic of an LC VCO 240, and the oscillation frequency of the LC VCO 240 is:

$$F_{LC} = \frac{1}{2\pi\sqrt{LC}} \quad \text{Equation 1}$$

Where FLC is the center frequency of the LC oscillator, L is the inductance, and C is the capacitance.

The VCO 240 may include a varactor 320 capacitance in addition to the parasitic 340 capacitances of the circuit. The three main components of the VCO are: 1) the inductor, 2) the varactor 320, and 3) the negative resistance circuit 340. The varactor 320 provides a variable capacitance based on a control voltage. The drain, source, and bulk of a MOS transistor are tied together to produce the capacitor. The $V_{control}$ from the LPF 230 controls the drain and source voltages of the capacitor. Depending on $V_{control}$ the capacitance of the varactor 230 changes and, therefore, the frequency FLC of the VCO 240 also changes. As $V_{control}$ increases, the capacitance of the varactor 320 increases and the FLC (according to Equation 1) decreases. When the $V_{control}$ decreases, the capacitance of the varactor 320 decreases and the FLC increases.

The inductor 310 implemented in the VCO 240 includes an inherent parasitic resistance. The parasitic resistance results in losses and reduced voltage swing over a narrow-spread spectrum. A negative resistance circuit 340 is used to compensate for resistive losses and increase the voltage swing. The negative resistance circuit is implemented as a cross coupled MOS transistor topology. The signal from either arm of the VCO circuit is used as an output signal and is fed to the next stage (i.e. buffer 260).

3) Frequency Divider 250: The divider 250 generates an output signal with a frequency that is a fraction of the frequency generated by the VCO 240. Frequency dividers are implemented in a PLL to permit a phase comparison of the output signal from the VCO with the input reference signal from the off-chip crystal oscillator by the phase-frequency detector.

Figure 4:
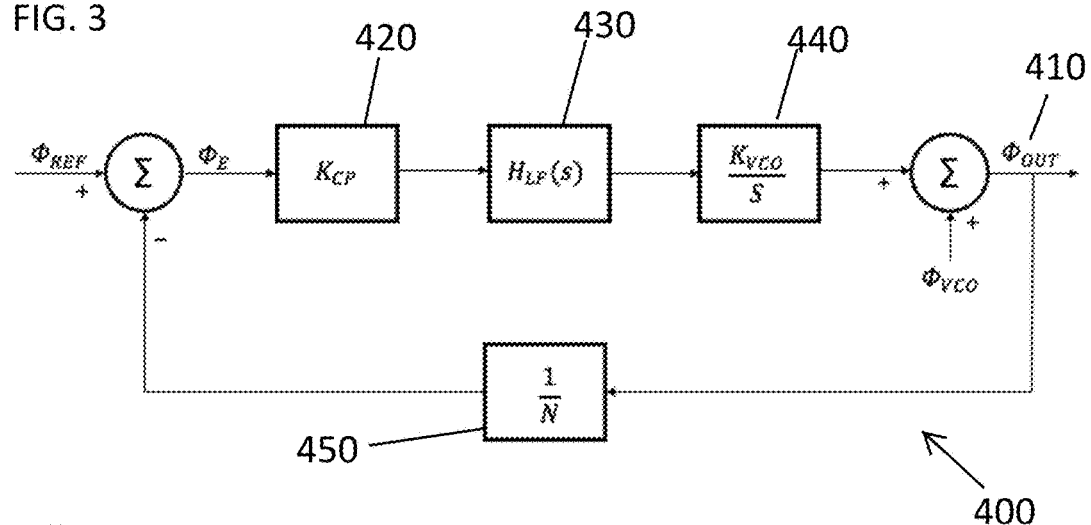
FIG. 4 is a linear model of a PLL.

FIG. 4 shows a linear model 400 of the PLL, which is used to determine the transfer function and phase noise. The transfer function of a typical PLL derived from a linear model, where (pout 410 represents the output phase, φin is the phase of the input signal, KCP 420 is the gain of the charge pump, HLF 430 is the gain of the low pass filter, KVCO 440 represents the gain of the VCO, and N 450 denotes the order of the PLL. The general form of the transfer function of the PLL is H(S)=ωc/(s+ωc), which corresponds to the transfer function of a low pass filter. the PLL therefore behaves like a low pass filter of the input reference signal according to the equation:

$$\frac{\phi_{out}}{\phi_{in}} = \frac{K_{CP}H_{LF}(S)K_{VCO}N}{sN + K_{CP}H_LF(s)K_{VCO}} \quad \text{Equation 3}$$

B. Phase Notes

Phase noise is the frequency domain representation of random fluctuations in the signal waveform. Jitter is the time domain representation of phase noise. For an ideal oscillator, the frequency domain representation of the output frequency is a pair of Dirac delta functions. Due to phase noise, the power of the signal is spread to adjacent frequencies. The phase noise includes low frequency flicker and white noise and is expressed in units of dBc/Hz. For a PLL, the phase noise may be measured at frequencies of 1 kHz and 1 MHz. The phase noise of the VCO in the frequency and time domain is given by, respectively, $$\frac{\phi_{out}}{\phi_{VCO}} = \frac{sN}{sN + K_{CP}H_LF(s)K_{VCO}} \quad \text{Equation 3}$$

$$Jitter_{sec} = \frac{\sqrt{\int_{-\infty}^{\infty} 10^{\frac{PhaseNoise_{dBc/Hz}}{10}}}}{2\pi f} \quad \text{Equation 4}$$

where $f$ is the center frequency of the PLL, KCP is the gain of the charge pump, KVCO is the VCO gain, and HLF(s) is the transfer function of the filter stage. The general form of Equation 3 is $H(S)=s/(s+\omega c)$, which is the transfer function of a high pass filter. the PLL therefore behaves like a high pass filter for the output signal produced by the VCO. In addition, when s approaches zero, the phase noise with respect to the reference clock signal increases linearly with the divider ratio N.

C. Setting Time

The settling time is the amount of time required to return to the ideal operating conditions of the PLL on the application of a step input, which characterizes the response and recovery of the PLL to noise or erroneous inputs. The propagation delay of the circuit and the time required for the output to settle to within the specified error are included in the settling time. For a PLL, the settling time is the duration required for the output to settle to a particular frequency in response to phase shifts in the circuit. The settling time is frequently measured in terms of the damping factor $\zeta$ given by $$\zeta = \frac{1}{2}\sqrt{\frac{\omega_1}{K_v}} \quad \text{Equation 5}$$

where Kv is the product of the phase detector gain and the gain of the VCO and $\omega_1$ is the 3 dB cutoff frequency of the VCO.

IV. Analog Obfuscation

The obfuscation of digital circuits may entail the masking of boolean functions and logical values. Analog circuit operation, however, depends on a continuous range of input/output values as well as the setting of various biasing parameters, resulting in increased complexity when implementing obfuscation of analog blocks. In addition, analog circuits are tightly designed within parameter bounds to match target gains, phase noise, and bandwidth, with any added circuitry causing shifts in the parameter characteristics. The challenge therefore becomes obfuscating the circuit while minimally affecting circuit parameters.

The proposed technique targets obfuscation of critical circuit parameters of the analog block, including the gain of an amplifier, cutoff frequency of filters, and the operating frequency of a PLL. As analog circuits are typically designed in stages, distributing the key bits across critical circuit parameters of each stage results in low area overhead and reduced impact on the circuit parameters.

V. Key Based Parameter Obfuscation

Analog ICs may be more sensitive to noise and temperature (tighter noise margins) as compared to digital circuits. Setting the correct biasing points in an analog circuit is therefore critical to establish the proper operating conditions, as circuit functionality and performance are directly dependent on the set bias voltages and currents. The key-based obfuscation technique herein targets the physical dimensions of the transistors used to set the optimal biasing conditions. The width of a transistor may be obfuscated and, based on an applied key sequence, provide a range of potential biasing points. Only when the correct key sequence is applied and certain transistor(s) are active, are the correct biasing conditions at the target node set. The technique may be applicable to various biasing parameters including setting the voltage/current at a node or modifying the gain of the circuit.

A. Obfuscation of Voltage Biasing Node

Figures 5A, 5B:
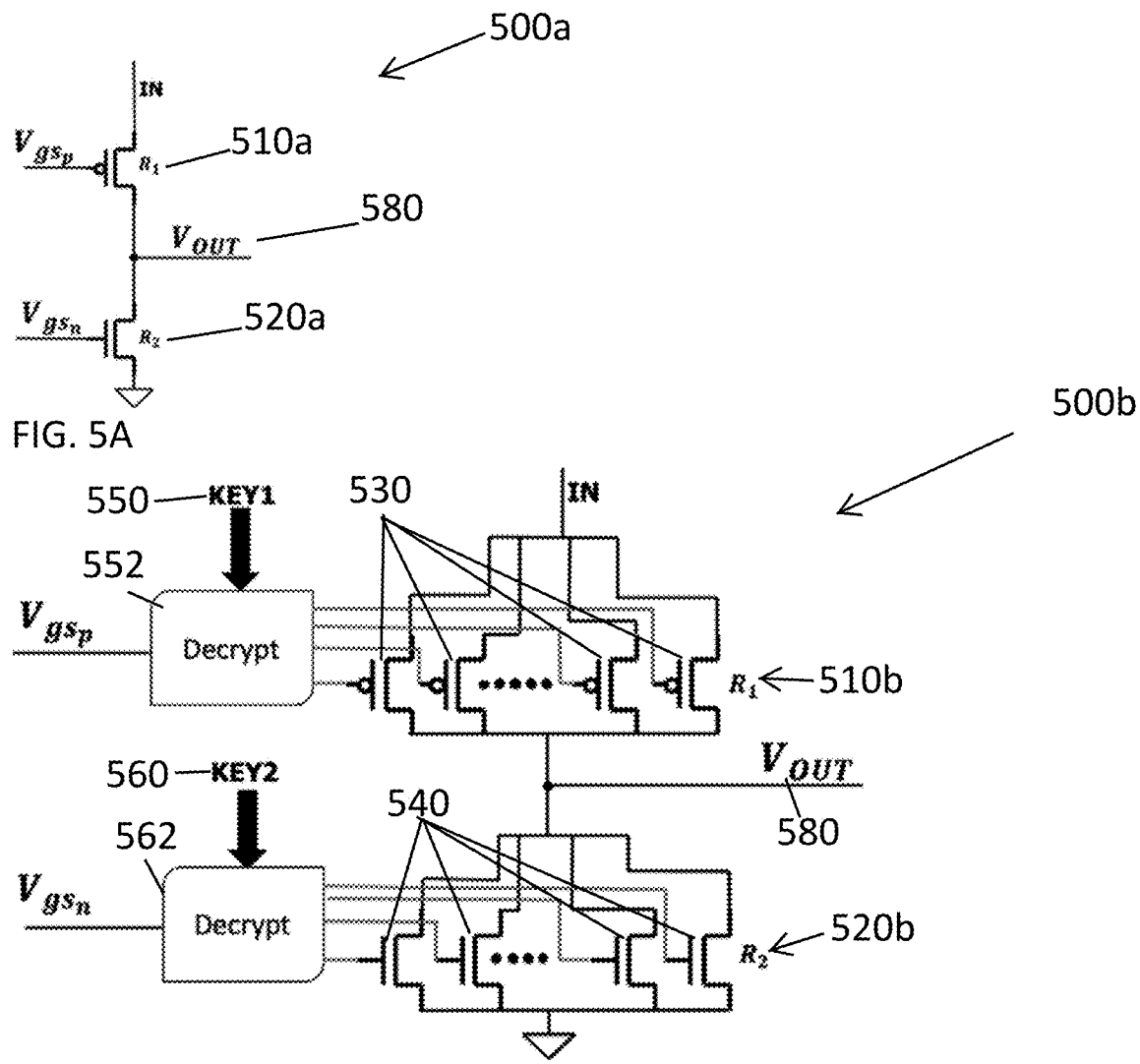
FIGS. 5A and 5B show a voltage bias circuit that is (A) unencrypted and (B) obfuscated.

FIG. 5A shows a typical voltage biasing circuit 500a. The unencrypted biasing circuit 500a receives voltages Vgsp, Vgsn and produces resistances R1 and R2 of first and second transistor circuits 510a, 520a. In the encryptable biasing circuit 500b shown in FIG. 5B, the resistances R1 and R2 of variable width and/or length (the physical properties) first and second transistors 510b, 520b are directly proportional to the combined width of at least two transistors shown inclusively as 530, 540 (shown as PMOS/NMOS transistors in parallel to vary the width). Application of the correct key sequences KEY1 550 and KEY2 560 into decrypt blocks 552, 562 activates the proper path of at least two transistors 530, 540 and in turn achieves a length/width (width in FIG. 5B) with a resistance R1, R2 set to achieve the desired Vout 580.

Similar to 500b, the encryptable biasing circuit can be designed as parallel connections of series transistors, where each parallel path has at least two transistors in series with different lengths, thereby encrypting the length of the transistor circuits 510a and 520a. Application of the correct key sequences KEY1 550 and KEY2 560 into decrypt blocks 552, 562 selects the proper path among the parallel paths, and at least two transistors in the selected path are activated and in turn achieves the desired length with resistance R1, R2 to achieve the desired Vout 580.

Similarly, the encryptable biasing circuit can be designed as a mesh to encrypt both width and length, where, in the mesh, horizontal (parallel) transistors encrypt the width and vertical (series) connection of transistors encrypt the length. Application of the correct key sequences KEY1 550 and KEY2 560 into decrypt blocks 552, 562 selects the proper parallel path/paths (encrypting the width of transistor circuits 510a, 520a) and proper series path/paths (encrypting the length of transistor circuits 510a, 520a) and in turn achieves the desired length with resistance R1, R2 to achieve the desired Vout 580.

B. Obfuscation of Current Biasing Node

The current at a target node is given by Equation 6, which is the drain to source current Ids of a transistor operating in the linear mode. The output current Ids is directly proportional to the width of the transistor.

$$I_{ds} = \mu_n C_{ox} \frac{W}{L}\left[(V_{gs} - V_t)V_{ds} - \frac{V_{ds}^2}{2}\right] \quad \text{Equation 6}$$

where $\mu_n$ is the mobility of the electrons, $C_{ox}$ is the gate oxide capacitance, W is the gate width of the transistor, L is the gate length of the transistor, $V_{th}$ is the threshold voltage of the transistor, $V_{gs}$ is the gate-to-source voltage, $V_{ds}$ is the drain-to-source voltage, and $I_{ds}$ is the drain-to-source current of the transistor.

Figures 6A, 6B:
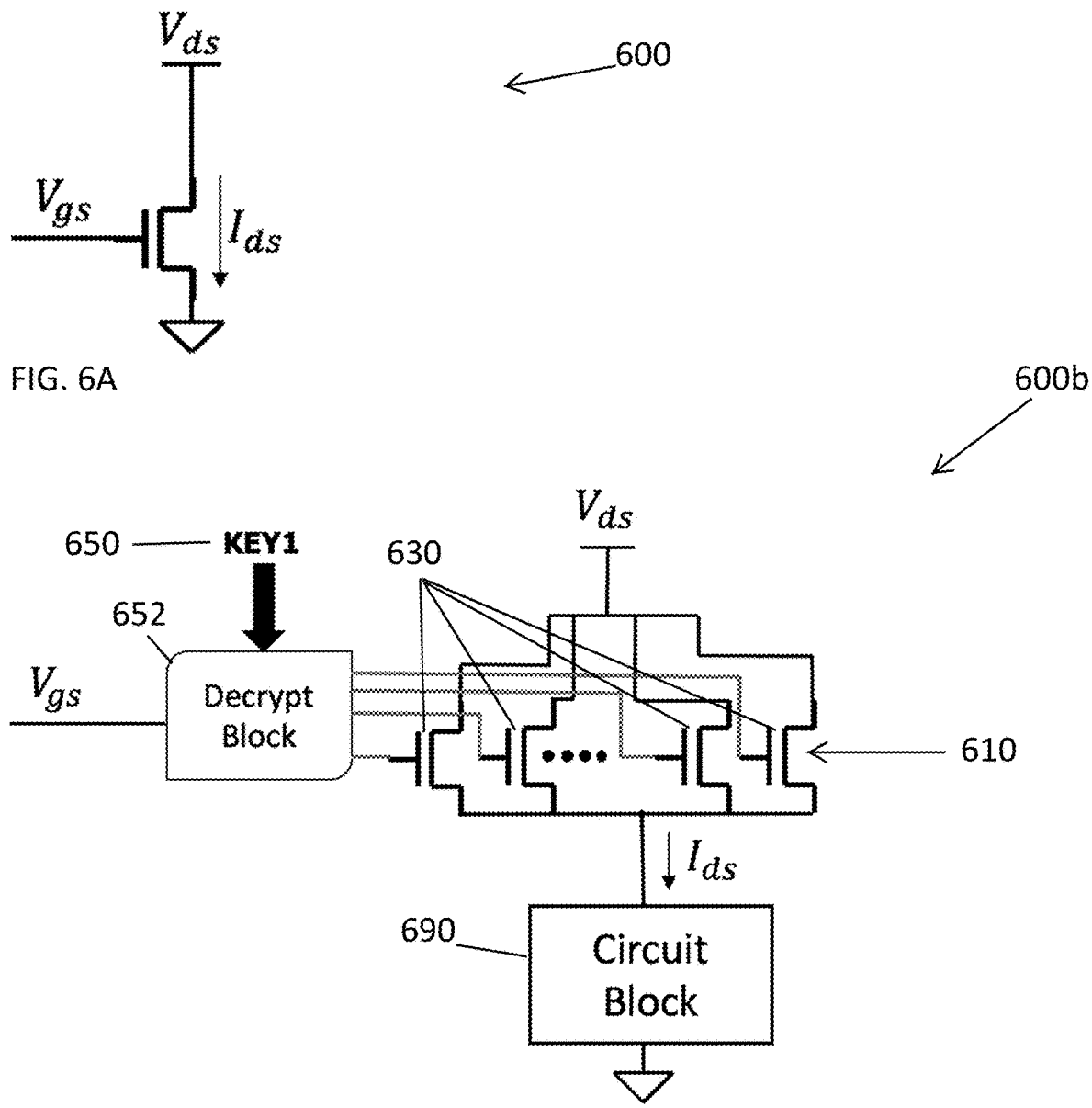
FIGS. 6A and 6B show a current bias circuit that is (A) unencrypted and (B) obfuscated.

Similar to what was shown in FIGS. 5A and 5B for varying voltage by changing the transistor width, FIG. 6A shows a typical current bias circuit 600a. The secured current bias circuit implemented with the proposed technique 600b is shown in FIG. 6B. When the correct key sequence KEY1 650 is applied to the decrypt block 652, the appropriate at least two transistors 630 are activated resulting in an overall transistor circuit 610 width, and if the key 650 is the predetermined value, this establishes the desired current bias Ids to the circuit block 690.

Similar to 600b, the encryptable biasing circuit can be designed as parallel connections of series transistors, where each parallel path has at least two transistors in series with different lengths, thereby encrypting the length of transistor in 600a. Application of the correct key sequences KEY1 650 into decrypt blocks 652 selects the proper path among the parallel paths, and at least two transistors in the selected path are activated and in turn achieves the desired length with current Ids.

Similarly, the encryptable biasing circuit can be designed as a mesh to encrypt both width and length, where, in the mesh, horizontal (parallel) transistors encrypt the width and the vertical (series) connection of transistors encrypt the length. Application of the correct key sequences KEY1 650 into decrypt blocks 652 selects the proper parallel path/paths (encrypting the width of transistor in 600a) and proper series path/paths (encrypting the length of transistors in 600a) and in turn achieves desired length, resulting in an overall desired current Ids.

The proposed technique is applicable to the obfuscation of other width dependent circuit parameters including capacitance and gain.

VI. Implementation of Key Based Width Obfuscation on a PLL

Figure 7:
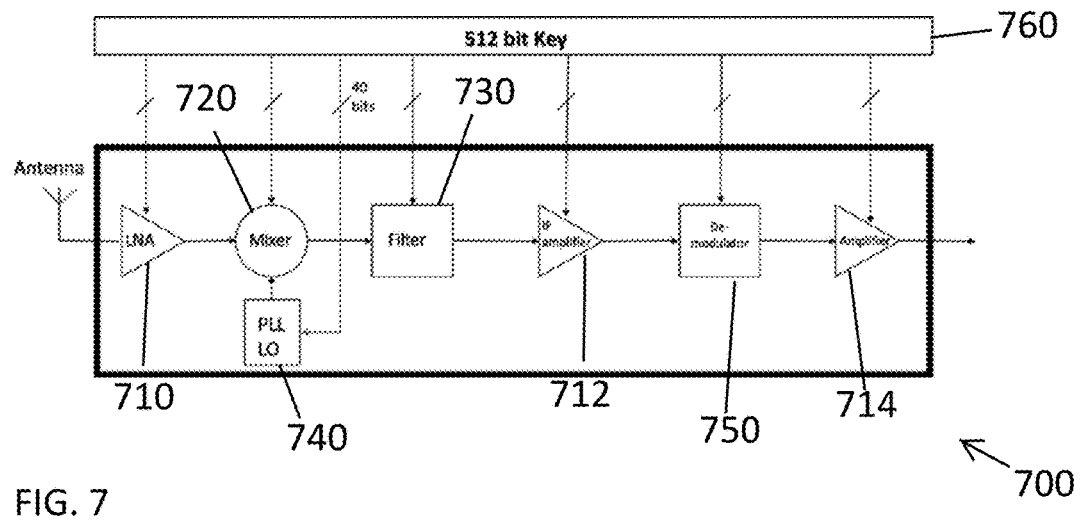
FIG. 7 shows a block diagram of a superheterodyne receiver with an integrated PLL local oscillator (LO).

In the analog domain, an emphasis on research and product development has focused on radio-frequency front end circuits. A typical RF superheterodyne receiver 700 includes a combination of amplifiers 710, 712, 714, a mixer 720, a filter 730, a PLL 740, and a demodulator 750, as shown in FIG. 7.

The objective is to obfuscate each stage of the superheterodyne receiver 700 using the proposed width based obfuscation technique. A 512-bit key 760 secures the parameters of the receiver 700, with 40-bits used for the obfuscation of the PLL frequency. The performance of the obfuscated PLL may be compared with a standard PLL.

The proposed width based parameter obfuscation technique may be implemented on a type-II 3rd order phase locked loop (PLL) for the mixer block of a superheterodyne receiver. The type-II 3rd order PLL may provide greater flexibility to adjust the loop bandwidth and gain. In addition, a type-II PLL offers a wider acquisition range and is ideal for high-performance digital integrated circuits. As shown in FIG. 2, the components of a type-II 3rd order PLL are the phase frequency detector (PFD), the charge-pump (CP), the loop filter (LF), the voltage controlled oscillator (VCO), and the frequency divider.

The PFD is based on an edge triggered D flip-flop architecture as described in Section III. The charge pump may be a cascode design to minimize charge sharing and to suppress voltage spurs. The selection of an LC based VCO provides superior phase noise performance as compared to other VCO topologies. A divide by 32 frequency divider may be implemented to permit comparison of the phase of the input signal from the off-chip crystal oscillator with the phase of the output signal from the PLL.

Figure 8:
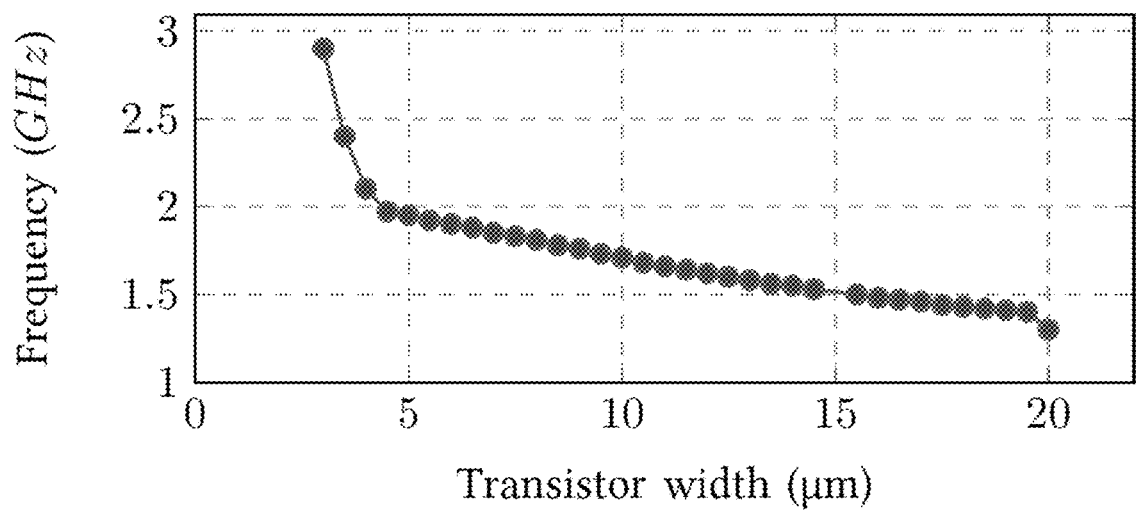
FIG. 8 shows a characterization of the VCO frequency as a function of the width of the negative resistor.
Figure 9:
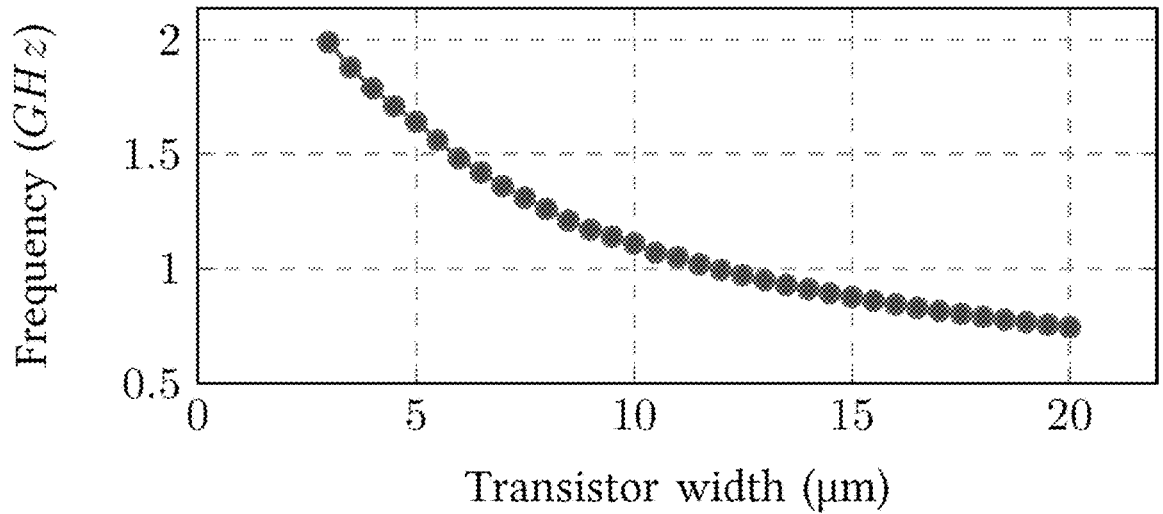
FIG. 9 shows a characterization of the VCO frequency as a function of the width of the varactor.
Figure 10:
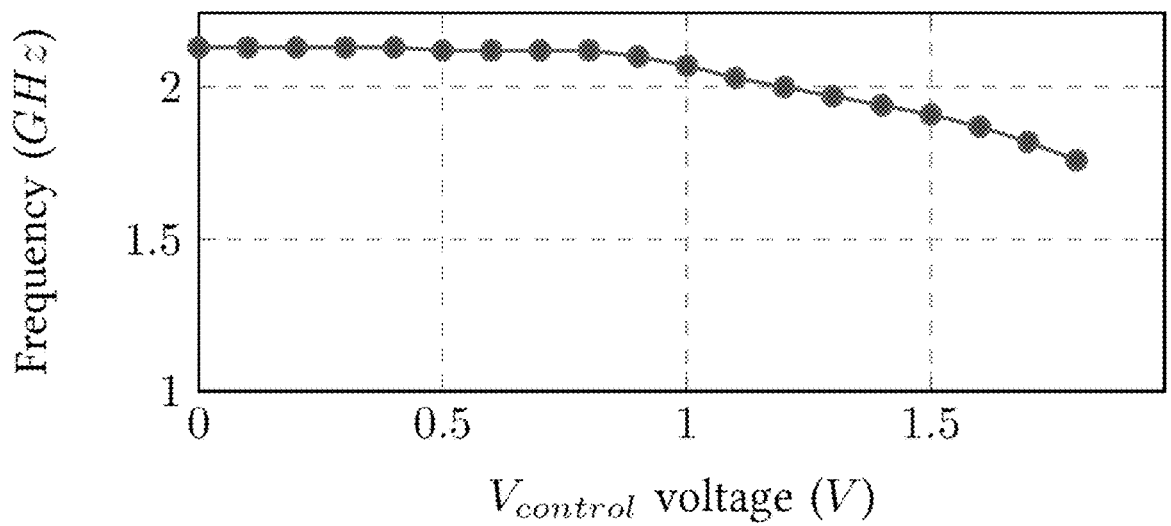
FIG. 10 shows a characterization of the VCO frequency as a function of the control voltage.

The biasing parameters of the VCO selected for obfuscation may be: 1) the range of the control voltage, 2) the size of the varactor, and 3) the size of the negative resistance circuit. The three chosen biasing parameters significantly impact the frequency range, lock-in range, bandwidth, and jitter performance of the PLL. The variation in the output frequency of the VCO due to the negative resistance circuit, varactor, and control voltage is shown, respectively, in FIGS. 8, 9, and 10. The dependence of the output frequency on the sizes of the transistors in the VCO is used to implement the proposed security technique and mask the true output frequency of the PLL.

Figure 11:
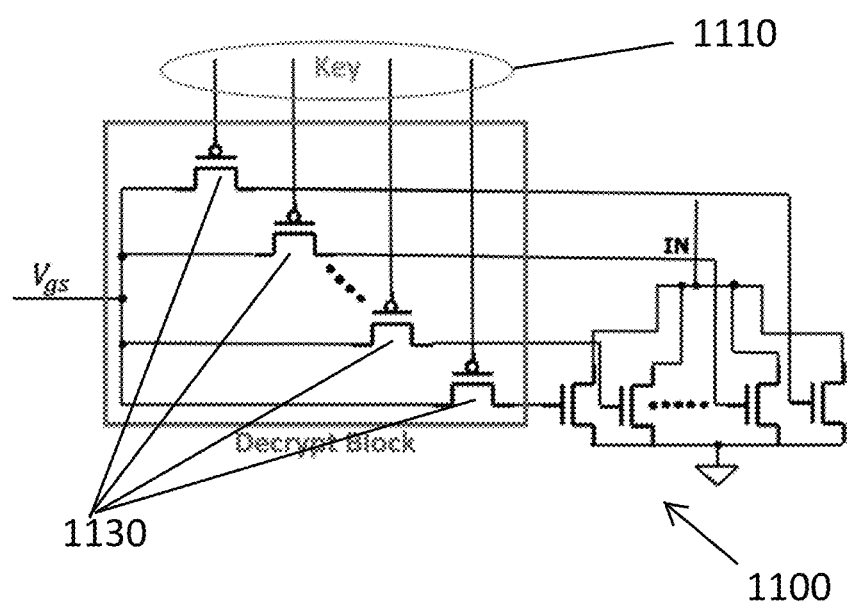
FIG. 11 shows a schematic of the decryption block.

The varactor and negative resistance circuit may be divided into 10 transistor widths on both symmetric current paths of the VCO. A total of 40 transistors are therefore implemented to mask the VCO output frequency. When the correct key sequence is applied, the VCO may produce the expected output frequency. The key sequences may be distributed by means of a simple pass transistor topology 1100, as shown in FIG. 11, in which the key 1110 controls the on or off states of the obfuscated transistors 1130. The key 1110 may be digital (i.e. 0 or 1 value), where a key value 1 implies that the obfuscated transistor connected to the pass transistor is on and key value 0 implies that the obfuscated transistor is off.

VII. Trial Results

The un-obfuscated and obfuscated PLLs may be designed in a 180 nm CMOS process. An input reference clock of 55 MHz was used, and the target operating frequency of the PLL was 1.75 GHz.

The active transistor area of the PLL increased by 6.3% from 6.885 µm^2 to 7.319 µm^2 when accounting for the additional transistors and the key-delivery circuit. The key length for the obfuscated circuit is 40 bits. The probability of obtaining the correct frequency of the PLL under ideal conditions through brute force attack is $9.095 \times 10^{-13}$. The probability is further reduced by adding additional key bits with the corresponding parallel transistor widths. Although an incorrect key produces an output from the PLL, the frequency will not match the 1.75 GHz target, requiring an adversary to observe all input-output combinations to correctly determine the key. The comparison of the critical parameters of an obfuscated and un-obfuscated PLL are listed in Table 1.

TABLE I

Characterization of obfuscated and unobfuscated PLLs.

| Parameter | Unobfuscated PLL | Obfuscated PLL |
|---|---|---|
| Locking Frequency | 1.75 GHz | 1.76 GHz |
| Area | 6.885 µm² | 7.3192 µm² |
| Settling Time | 300 ns | 700 ns |
| Power | 22.1 mW | 22.3 mW |
| Phase noise @1 MHz | −116.5 dBc/Hz | −111.1 dBc/Hz |
| Phase noise @1 kHz | −30.59 dBc/Hz | −26.51 dBc/Hz |

VIII. Design Insight for Implementing Parameter Obfuscation

A challenge faced during the design and characterization of the obfuscated PLL was the high sensitivity of the circuit to variations in device parameters and parasitics. Any deviation of device parameters resulted in a penalty in performance. The additional transistors needed to implement the obfuscation technique resulted in increased parasitics, which required further circuit optimization to meet the target performance.

The inter-dependence of biasing conditions caused additional challenges, in particular when trying to determine transistor widths that produce a limited set of unique keys. There were redundant biasing conditions that produced the desired output frequency, and eliminating these conditions was a challenge.

Although process, voltage, and temperature (PVT) variations typically produce undesired effects on circuit parameters, there are potential benefits when used to generate an unique key sequence for analog circuit blocks. Analog circuits in sub-90 nm technology nodes are particularly vulnerable to process variations. Post silicon tuning of analog circuits compensates for PVT based variations, where an offset voltage is determined and applied to the circuit to counteract the effects. PVT compensation complimented with the proposed width obfuscation technique results in a two stage protection, where the initial key is required to coarsely set the biasing conditions of the circuit and a second key is used to fine tune the targeted parameters. An additional benefit is that each analog IC now requires a unique key as the tuning of parameters differs between dies.

IX. Analog Satisfiability (aSAT) for Design Space Exploration

Satisfiability based verification for analog and mixed signal (AMS) circuits has gained significance due to the development of powerful SAT solvers. The SAT based techniques provide both the capacity and the efficiency required for solving linear as well as non-linear equations with interval arithmetic constraints.

A. Problem Formulation

The proposed satisfiability technique may use generic analog circuit design equations such as for gain, operating frequency, phase noise, and bandwidth to determine transistor sizes that meet the given circuit constraints and specifications. The range of widths and lengths along with the circuit constraints are inputs to the aSAT solver. The general formulation of the SAT problem is written as $$X_{min} \leq X \leq X_{max},$$

$$Y_{Pmin} \leq Y_p \leq Y_{Pmax};$$

$$y_j = f(x_i) \qquad \text{Equation 7}$$

where, $[X_{min}; X_{max}]$ is the range of transistor sizes, $[Y_{pmin}; Y_{pmax}]$ is the ranges of the circuit constraints, $X = \{x_i = 1 \ldots n\}$ are the transistor sizes (length and width) for n number of transistors, $Y_p = \{y_j = 1 \ldots m\}$ are the performance parameters, $y_i = f(X); j = 1 \ldots n$ are the mapping equations from X to Y, and p is the index representing each individual constraint.

B. SAT Algorithm

The use of SAT to determine the widths of transistors for a given set of analog circuit constraints is described by Algorithm 1.

Algorithm 1: Width estimation algorithm
given:
    circuit constraint formulae $\varphi$;
    S=empty solution set;
while solution≠UNSAT do
    construct interval [solution $-\Delta$, solution$+\Delta$];
    $S=S_u$ [solution$-\Delta$, solution$+\Delta$];
    $\varphi=\varphi\hat{\ }(x, y)^{\not\in}$[solution$-\Delta$, solution$+\Delta$];
    Check for Satisfiability;
end while
return S;

The SAT solver begins by choosing a random width and performance range (X; Y) for each circuit node with interval [solution$-\Delta$, solution$+\Delta$]. Guidance constraints$(x, y)^{\not\in}$[solution$-\Delta$, solution$+\Delta$] are added, which force the algorithm to search for solutions beyond the interval. If a new solution is found by the SAT solver, the solution is used to construct new performance and guidance intervals that include the satisfied conditions from the current guidance interval. The step of updating the performance ranges and guidance interval is continued until the solver returns UNSAT. The union of all the intervals is the superset of the solution space.

The objective of the parameter space exploration algorithm is to determine a feasible performance space and transistor operating range for the given constraints and specifications. The cost of solving SMT based circuit equations increases exponentially with increasing constraints or with wider parameter ranges. Large dimensions lead to a large initial performance space, which is computationally expensive to search. To address the increased computational cost, the large ranges (transistor dimensions) are sub-divided into smaller ranges. The aSAT algorithm is then applied to each individual sub-space. The benefit of sub-dividing the design space is that each sub-domain is run independently and in parallel, which decreases the computational time.

Parameter biasing obfuscation overcomes issues regarding multiple correct keys (multiple widths that produce the desired circuit response) and the limited deviation in performance for incorrect keys. These challenges are addressed through aSAT analysis by sub-dividing the entire design space and by setting the precision of the performance range as an additional constraint. The SAT solver is forced to output all the transistor dimensions that fall within the targeted performance range, which are a discrete set of points in the design space. The widths of the obfuscated transistors are selected such that only one combination of widths represents the solution point and the remaining combinations fall outside the solution range, ensuring that only a limited number of keys produce the target performance specifications.

X. Conclusions

An analog obfuscation technique that implements key-based logic encryption is described. A VCO based reference and obfuscated PLL were implemented in a standard 180 nm CMOS process to demonstrate the implementation of the proposed technique. Circuit parameters including the settling time, power, and phase noise for both the obfuscated and un-obfuscated PLL were characterized. An improvement in the security of an analog IC is achieved when implementing the proposed technique with a 6.3% increase in area, 0.89% increase in power consumption, and 5 dBc/Hz increase in phase noise. The probability of determining the correct key sequence through a brute force attack is 9.095×10−13. By implementing the proposed technique on multiple analog components in the integrated circuit, the key space is increased and the overall security is further improved. The analog obfuscation technique complements existing digital logic encryption to further protect modern ICs. The proposed technique is therefore an effective countermeasure against IP theft, counterfeiting, and overproduction of analog and mixed signal circuits.

While the invention has been described with reference to the embodiments above, a person of ordinary skill in the art would understand that various changes or modifications may be made thereto without departing from the scope of the claims.

The invention claimed is:

1. A key-based parameter obfuscation architecture comprising;
 a first key decryption block that receives a first key; and
 a first transistor circuit comprising a first at least two transistors connected to the first key decryption block, wherein the first at least two transistors share an output that is an output of the first transistor;
 wherein upon receipt of the first key in the first decrypt key block, some of the first at least two transistors are activated, resulting in the change of a physical property of the first transistor circuit;
 wherein a phase frequency detector (PFD) generates a voltage signal corresponding to a phase difference between a reference clock and feedback path, which are fed into two flip flops, wherein when two signals of the PFD have a zero-phase difference, the PFD generates a constant output voltage, wherein when there is a phase difference between the two signals, a varying voltage is generated dependent on which of the two signals is leading or lagging.

2. A key-based parameter obfuscation architecture of claim 1, wherein the physical property is a width of the first transistor circuit.

3. A key-based parameter obfuscation architecture of claim 2, wherein the first at least two transistors are in parallel within the first transistor circuit.

4. A key-based parameter obfuscation architecture of claim 1, wherein the physical property is a length of the first transistor circuit.

5. A key-based parameter obfuscation architecture of claim 4, wherein the first at least two transistors are in series within the first transistor circuit.

6. A key-based parameter obfuscation architecture of claim 1, wherein the physical property is a width and length of the first transistor circuit.

7. A key-based parameter obfuscation architecture of claim 6, wherein the first at least two transistors are in parallel and at least two transistors are in series within the first transistor circuit.

8. The key-based parameter obfuscation architecture of claim 1, further comprising, in parallel with the first key decrypt block and first transistor circuit:
 a second key decryption block that receives a second key; and
 a second transistor circuit comprising a second at least two transistors connected to the second key decrypt block wherein the second at least two transistors share an output that is an output of the second transistor circuit;
 wherein upon receipt of the second key in the second key decryption block, some of the second at least two transistors are activated, resulting in the change of a physical property of the second transistor circuit.

9. The key-based parameter obfuscation architecture of claim 8, wherein the first transistor circuit and second transistor circuit are in parallel and share a voltage out.

10. The key-based parameter obfuscation architecture of claim 9, wherein when the first key and the second key are applied in a correct key sequence, the voltage out is a predetermined value.

11. The key-based parameter obfuscation architecture of claim 10, wherein when the voltage out is not a desired value, the analog circuit does not function properly.

12. The key-based parameter obfuscation architecture of claim 1, wherein the first transistor circuit's widths determines a current out from the architecture.

13. The key-based parameter obfuscation architecture of claim 12, wherein when the first key and the second key are applied in a correct key sequence, the current out is a predetermined value.

14. The key-based parameter obfuscation architecture of claim 13, wherein when the current out does not equal the predetermined value, the analog circuit does not function properly.

15. The key-based parameter obfuscation architecture of claim 14, wherein the current out is calculated according to the formula:

$$I_{ds} = \mu_n C_{ox} \frac{W}{L}\left[(V_{gs} - V_t)V_{ds} - \frac{V_{ds}^2}{2}\right]$$

where $\mu_n$ is the mobility of electrons, $C_{ox}$ is a gate oxide capacitance, W is the gate width of a transistor, L is the gate length of a transistor, $V_{th}$ is the threshold voltage of a transistor, $V_{gs}$ is the gate-to-source voltage, $V_{ds}$ is the drain-to-source voltage, and $I_{ds}$ is the drain-to-source current of a transistor.

16. The key-based parameter obfuscation architecture of claim 1, wherein the technique is applicable to any analog circuit parameters including gain, bandwidth, phase noise, cut-off frequency, bias voltage and current, operating frequency.

17. The key-based parameter obfuscation architecture of claim 1, wherein the charge pump converts logical output signals of the PFD to an analog signal suitable to control the voltage-controlled oscillator (VCO).

18. The key-based parameter obfuscation architecture of claim 1, wherein the analog circuit is included in an amplifier.

19. A key-based parameter obfuscation architecture comprising;
 a first key decryption block that receives a first key; and
 a first transistor circuit comprising a first at least two transistors connected to the first key decryption block, wherein the first at least two transistors share an output that is an output of the first transistor;
 wherein upon receipt of the first key in the first decrypt key block, some of the first at least two transistors are activated, resulting in the change of a physical property of the first transistor circuit;
 wherein the first transistor circuit's widths determines a current out from the architecture;
 wherein when the first key and the second key are applied in a correct key sequence the current out is a predetermined value;

wherein when the current out does not equal the predetermined value, the analog circuit does not function properly;

wherein the current out is calculated according to the formula:

$$I_{ds} = \mu_n C_{ox} \frac{W}{L}\left[(V_{gs} - V_t)V_{ds} - \frac{V_{ds}^2}{2}\right]$$

where $\mu_n$ is the mobility of electrons, $C_{ox}$ is a gate oxide capacitance, W is the gate width of a transistor, L is the gate length of a transistor, $V_{th}$ is the threshold voltage of a transistor, $V_{gs}$ is the gate-to-source voltage, $V_{ds}$ is the drain-to-source voltage, and $I_{ds}$ is the drain-to-source current of a transistor.

\* \* \* \* \*